Aug. 24, 1954   F. O. ANDEREGG   2,687,041
APPARATUS FOR MEASURING HUMIDITY
Filed Jan. 19, 1949
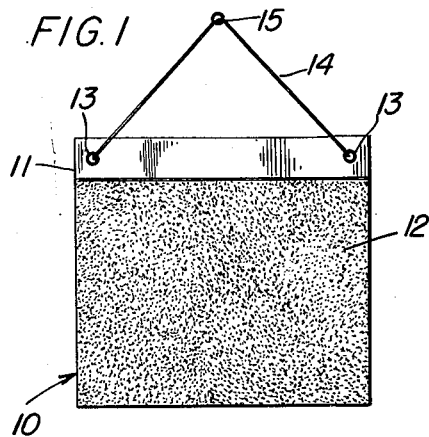
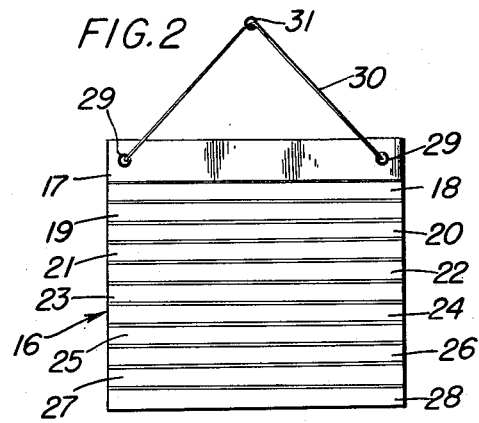
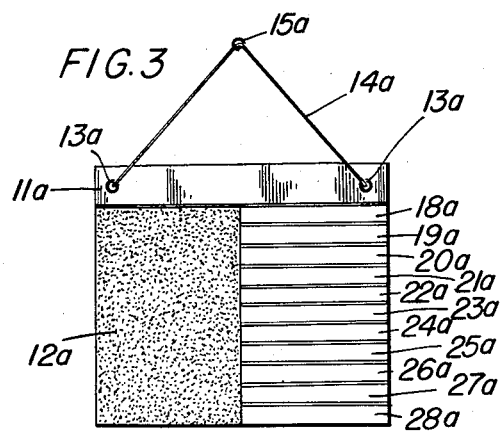
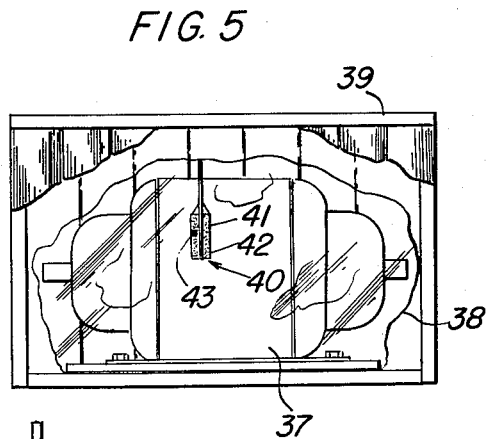
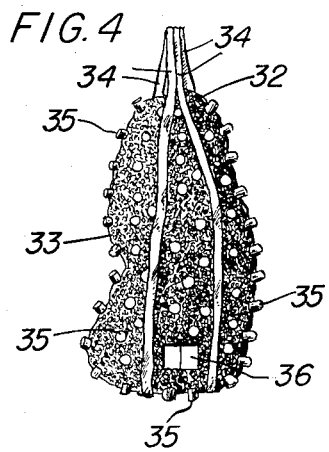
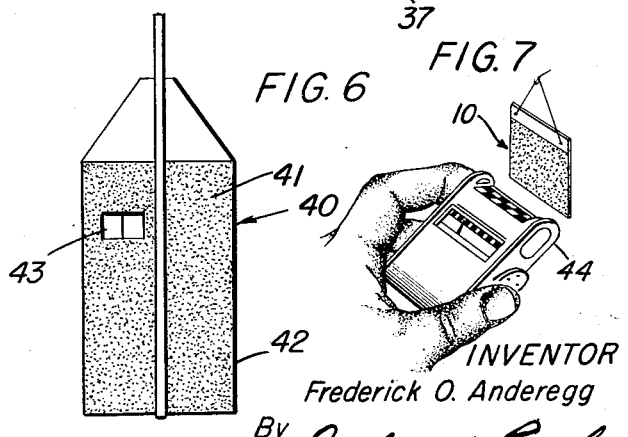
INVENTOR
Frederick O. Anderegg
By *Lucke & Lucke*
Agents Patented Aug. 24, 1954

2,687,041

UNITED STATES PATENT OFFICE 2,687,041

APPARATUS FOR MEASURING HUMIDITY

Frederick O. Anderegg, Readington Township, Hunterdon County, N. J.

Application January 19, 1949, Serial No. 71,619

5 Claims. (Cl. 73—335)

This invention relates to humidity control, and more particularly to the determination of the degree of humidity or the degree of dehumidification in a given chamber or the degree to which a hygroscopic substance has become saturated. The invention is especially useful in determining when to regenerate or replace a unit of dehumidifying material to which use, however, it is not restricted.

This application is a continuation in part of my patent application, Serial No. 569,201, filed December 21, 1944, for "Desiccant or Dehydrating Device," and of my patent application, Serial No. 569,202, filed December 21, 1944, for "Desiccant Assembly." Both of these applications are now abandoned.

It is desirable or necessary in many fields of activity to reduce or adjust the humidity of a volume of air. The subject air may be a moving column of air, or it may be substantially still air inclosed in a chamber or container. Such humidity reduction or adjustment may be effected in a variety of ways. Where large volumes of air are to be dehumidified, the air may be chilled to the extent necessary to condense the required proportion of its moisture; and the condensate may then be removed. In the case of smaller volumes of air, a hygroscopic or deliquescent substance may be employed to dehumidify or adjust the humidity of the air. Other methods of dehumidification or humidity adjustment are, of course, well known. Regardless of the method employed, however, it is always desirable, and frequently indispensible, to have some measure of the humidity present or the degree of saturation of the hygroscopic or deliquescent substance, where one is used.

I have now found it possible to provide a simple, convenient and inexpensive visual indicator whereby the humidity of the air, in a moving column or in a chamber or container, may be shown definitely and quantitatively to a sufficient extent for all practical purposes. The same method of indication is equally effective in showing the degree of saturation of a dehumidifying hygroscopic material.

According to the invention, a visual indicator is provided which changes its reflectivity, or its apparent shade or color progressively with variations in humidity. A scale is provided for comparison; and, by gauging the appearance of the indicator with respect to the scale, the degree of humidity or saturation may be determined.

The invention also contemplates the use of a pigment to give greater contrast as the apparent shade or color of the indicator varies. In cases where pigment is used, the scale is, of course, correspondingly colored.

In the past cobalt chloride has been added to dehumidifying materials to indicate absorption of moisture thereby. Cobalt chloride changes color with absorption of moisture, from the blue color of the anhydrous salt to the pink color of the hydrated salt. Such change of color is the result of a chemical change: that is to say, the chemical union between the salt and the water of hydration. Furthermore, I have found that, in connection with any of the dehumidifying materials mentioned in my Patent No. 2,255,041 granted September 9, 1941, for "Dehumidifying Material" unduly large amounts of cobalt chloride are required in order to produce the desired indication.

According to the present invention a pigment is employed which does not depend for its action upon chemical change. Such pigment may be added to the dehumidifying material in suitable quantities to produce the desired coloration.

The invention is shown by way of illustration in the accompanying drawings, in which—

Fig. 1 is a front elevation of a visual indicator constructed and arranged according to the invention;

Fig. 2 is a front elevation of a scale for use with the indicator illustrated in Fig. 1;

Fig. 3 is a combined indicator and scale;

Fig. 4 is a front elevation of a desiccant assembly pursuant to the invention;

Fig. 5 is a semi-diagrammatic elevation of a crated and transparently wrapped article protected from moisture according to the invention;

Fig. 6 is a front elevation of another form of desiccant assembly, also constructed and arranged according to the invention; and Fig. 7 illustrates a light meter suitable for quantitative reading of the reflectivity of the indicator.

In the drawings, Fig. 1 illustrates a visual indicator 10 comprising a plate 11, preferably of metal, and a thin coating 12 of a hygroscopic substance which changes its appearance progressively as it absorbs or loses moisture. The plate 11 is shown as perforated at 13, 13 for connection with a cord 14 carrying a ring 15, whereby the indicator 10 may be suspended in convenient position.

Fig. 2 illustrates a scale 16 for comparison with the indicator 10. The scale 16 comprises a plate 17, here shown as equal in size to the plate 11, divided into a series of strips 18 to 28 which are given successive appearances to correspond to the progressive changes in appearance of the coating 12 of the indicator 10 under increasing or decreasing degrees of moisture absorption. The plate 17, like the plate 11, is perforated, as at 29, 29, for connection with a cord 30 carrying a ring 31, whereby the scale 16 may be suspended adjacent the visual indicator 10 for comparison therewith.

The hygroscopic substance which is applied to the plate 11 as the thin coating 12 may be any such substance which takes the form of very small crystals which are highly diffractive of light. Hydrated lime mixed with calcium chloride constitutes one such substance. Still other suitable substances which may be employed as the thin coating are chlorohydrosilicate or chlorohydroaluminate, or a mixture of the two produced in accordance with my Patent No. 2,255,041, granted September 9, 1941, for "Dehumidifying Material."

Whatever the hygroscopic substance, it is mixed with sufficient water to form a paste of medium consistency, and applied in a very thin coating to the plate 11. The coating is preferably made so thin that no shrinkage cracks will develop upon drying. The coating is dried upon the plate. So dried, the hygroscopic substance will absorb moisture when present in sufficient amount, and having absorbed moisture, will give it up when the ambient humidity drops sufficiently.

Changes in the quantity of moisture absorbed will create changes in the reflectivity or light-reflecting capacity of the hygroscopic coating 12. Accordingly, the more moisture the coating absorbs, the darker its appearance becomes. Conversely, the smaller the quantity of moisture which has been absorbed by the coating 12, the lighter its shade or appearance. Under certain conditions the apparent color of the hygroscopic coating 12 becomes practically white. The apparent color changes are due to a decrease in light-reflecting capacity with increase in moisture absorption, and vice versa. However, the change in light-reflecting capacity occurs without change of color.

Without being committed to any theory in this connection, it may be stated that the phenomenon just described appears to be a physical, not a chemical change, of the same nature as the darkening of a sidewalk during a shower. It is presently believed that the fine granules of the coating reflect and diffract external light from their substantially infinite number of facets and edges with resulting apparent light color, very much in the manner of snow crystals which give the newly fallen snow a white appearance. Upon absorbing moisture, the facets and edges of the granules are progressively filmed over by the absorbed moisture without chemical change in the granules and, consequently, reflect and diffract the light in progressively lesser degree. The appearance of the coating 12 therefore, becomes progressively darker.

By providing the scale 16 with graduations progressively stepped from the lightest shade of the dry hygroscopic coating to the darkest shade of the saturated hygroscopic coating, it is possible to make a direct comparison between the visual indicator 10 and the scale 16, marked as described, in order to determine the degree of saturation of the hygroscopic material upon the indicator. To this end, the series of strips 18 to 28 may be applied to the scale 16 as progressively graduated calibrations by a very simple process. Thus successive known percentages of moisture are added to the coating 12 of the visual indicator 10 and the resulting appearance of the coating is reproduced upon the successive strips upon the scale 16. As here shown, eleven strips, 18 to 28 inclusive, are applied to the scale. It is contemplated that the strip 18 shall correspond to the appearance of the coating 12 when completely dry, and that the other strips shall indicate progressively the changing appearance of the coating under successive increments of 10% additional moisture. The strips 18 to 28 may then be marked in order, so that the degree or percentage of moisture upon the coating of the indicator 10 may be read directly from that strip upon the scale which corresponds to the appearance of the indicator. Accordingly, by suspending the indicator 10 and the scale 16 in a juxtaposed position in a duct, chamber or container, it is possible, by direct comparison, to obtain quantitative knowledge of the moisture present therein.

Instead of employing the separate visual indicator 10 and scale 16, illustrated in Figs. 1 and 2, the indicator and scale may be conveniently combined in a single unit. One such unit is illustrated in Fig. 3, wherein a coating 12a, like the coating 12, of the visual indicator 10, and a series of strips 18a to 28a, like the strips 18 to 28 of the scale 16, are applied in immediate adjacency upon a single plate 11a. Obviously, other arrangements of coating and strips might be employed.

It is found that greater contrast and greater ease in comparing the indicator with the scale result from adding a pigment to the hygroscopic material forming the thin coating 12 of the visual indicator. Mineral pigments are preferred, but various dyestuffs and lakes may be utilized. A binder for such pigments may consist of very finely divided hydrated lime, very finely divided white or grey Portland cement or the product formed by reacting finely divided aluminous material with lime by the methods disclosed in Patent No. 1,932,971, granted October 31, 1933, to Hutteman et al. for "Method of Making Light Weight Blocks." Other binders or adhesives may be used provided they do not seriously interfere with the porous character of the hygroscopic material.

A variety of pigments have been employed with satisfactory results. Such pigments include: (1) chromium oxide, which gives a green color to the coating 12 of the indicator; (2) ultramarine, which gives a brilliant blue color to the coating; (3) dark red ocher, which gives the described color to the coating; 4) light-red ocher; (5) burnt sienna, which gives an orange-red color to the coating; (6) yellow ocher; and (7) ferric oxide.

The pigmented hygroscopic material may be applied as a thin coating to the plate 11 by using a mixture of the pigment and calcium chloride together with a binder. The granules of the hygroscopic material may be coated with the pigment as they are being passed into the drier for drying upon the plate 11. Alternatively, a similar mixture containing the pigment may be applied as a dust coating to the solid hygroscopic material before final drying. It is also possible to add the pigment to the batch from which the dehumidifying material described in my Patent No. 2,255,041 is produced. The amount of pigment employed may vary from a trace to about 10% of the quantity of hygroscopic material employed. Although the proportions indicated give good results, acceptable performance has been realized with greater proportions of pigment.

Photospectrographic tests made with visual indicators having coatings of pigmented hygroscopic material have shown that the reflectivity of the indicator is reduced by between 42% and 53% as a result of complete saturation. The average loss of reflectivity by six samples when wet was 44%. All of the tests showed that the apparent visual color change through absorption of moisture was toward the violent end of the spectrum, regardless of the color of the pigment employed.

The invention is not limited to measuring the increase or decrease in reflectivity of a separate visual indicator. As disclosed in both of my co-pending patent applications, above-identified, it may prove desirable to measure the change in reflectivity of a body of hygroscopic material which is itself used for dehumidification. Such material may be the same hygroscopic material which is disclosed above as material suitable for the coating 12 of the indicator 10. Furthermore, any of the pigments above enumerated may be added to such hygroscopic material to provide greater contrast between the respective reflectivities of the material under different degrees of saturation.

In my patent application, Serial No. 569,201, now abandoned, there is described a comminuted mass 32 of calcium chloro composition carried within a bag-like container 33 of moisture-pervious, transparent material. See Fig. 4 of the drawings herein. The whole is suspended from tapes 34, passing around the bag-like container 33. Since the container may be damp when its contents become saturated, protuberences 35 having waterproof, moisture-repellant surfaces may be provided on the outer surface of the container 33 to protect surrounding articles from contact with the container. A chart or scale 36 affixed to the container 33 permits comparison between its standard gradations and the varying appearance of the comminuted mass 32 under different degrees of saturation. The particular chart or scale disclosed in my patent application, Serial No. 569, 201, now abandoned, is limited to two graduations: one corresponding to the appearance of the hygroscopic material when completely saturated, and the other to that of the material when dry. Such a scale is illustrated in Fig. 4 of the drawings in the present application. However, a scale similar to that illustrated in Fig. 2 of the drawings herein may be advantageously employed in connection with this embodiment.

In my patent application, Serial No. 569,202, now abandoned, there is disclosed a slightly different form of container and a very practical application thereof. As illustrated in Fig. 5 of the present drawings, a piece of machinery, here shown as a motor 37, is sealed within a transparent moisture-tight envelope 38, all within a crate 39. A dehydrating unit 40 is suspended in convenient manner within the envelope 38. The dehydrating unit comprises a body of hygroscopic material 41 suspended in a transparent, moisture-pervious, bag-like container 42 within the envelope 38 to take up any moisture therein and thereby protect the motor. A chart or scale 43 is affixed to the container 42 for comparison with the hygroscopic material therein. Although the scale described and illustrated in my patent application, Serial No. 569,202, now abandoned, has but two graduations, it will be obvious that a scale similar to the one illustrated in Fig. 2 of the drawings in the present application may advantageously be used upon the container 42. The dehydrating unit 40 is illustrated on a larger scale in Fig. 6 of the drawings herein.

In the event that any body of hygroscopic material—an indicator coating material, or another body of material employed for dehumidifying a chamber or container—becomes saturated, it is possible to regenerate the material by the application of heat and air. Thus the indicator 10, or the combined scale and indicator illustrated in Fig. 3, may be easily and quickly returned to its dry state after saturation. The hygroscopic material 32 carried in the bag-like container 33 or the material 41 of the dehydrating unit 40 may be similarly regenerated. However, because of the low cost of such material, it is frequently considered advantageous to discard saturated hygroscopic material and replace it with fresh material. In any event, the reflectivity of the material will indicate the degree of its saturation, and it may thus be determined when regeneration or replacement is required.

Many variations are, of course, possible in the use of the process and apparatus contemplated by the invention, and in the particular construction of the apparatus. The invention may be used in air conditioning, textile and flour manufacturing, protection of articles which become damaged by or deteriorate in the presence of moisture, and in many other applications. Furthermore, the action of the indicating material is reversible, the material being deliquescent or efflorescent depending upon the humidity of the surrounding atmosphere. In any case, a material of costant chemical composition is employed and the change in reflectivity occurs without chemical change, as described. Also, there is no actual change of color.

Further examples of uses to which the invention may be applied are measurement of humidity in stored hay, wheat, wood and other organic materials. The humidity may thus be maintained at a point below that at which fungus forms or bacterial action begins. Also the information given by the indicator and scale of the invention makes it possible to apply to hay sufficient moisture to make it properly succulent for feeding to stock, and to apply sufficient moisture to wheat for proper milling.

Finally, instead of a chart or scale for comparison with the visual indicator 10 or the hygroscopic material illustrated in Figs. 4 and 6, a simple light meter may be employed to permit quantitative reading of humidity in terms of reflectivity. Such a light meter 44 is illustrated in Fig. 7 of the drawings.

The forms of the invention here disclosed and illustrated, and the processes particularly described, are presented merely as examples of how the invention may be applied. Other forms, embodiments, methods and applications of the invention, coming within the scope of the appended claims, will readily suggest themselves to those skilled in the art of humidity control.

I claim:

1. Apparatus for measuring humidity comprising a body of a hygroscopic substance which changes its appearance progressively without change of color as it absorbs or loses moisture, and a chart positioned adjacent said body for comparison with said body, said chart being marked with successive graduations corresponding to successive appearances of said body under increasing degrees of humidity.

2. Apparatus for measuring humidity comprising a body of hygroscopic substance which changes its reflectivity progressively without change of color as it absorbs or loses moisture, a pigment applied to said hygroscopic substance, and a chart positioned adjacent said body for comparison with said body, said chart being marked with successive graduations corresponding to successive degrees of reflectivity of said body under increasing degrees of humidity.

3. Apparatus for measuring humidity comprising a body of calcium chloro composition, a pigment applied to said composition, and a chart fixed immediately adjacent said body for comparison with said body, said chart being marked with successive graduations corresponding to successive degrees of reflectivity of said body under increasing degrees of humidity.

4. Apparatus for measuring humidity comprising a plate, a thin coating of granulated hygroscopic material of constant chemical composition on said plate, a pigment applied to said material, and a chart upon said plate for comparison with said indicator, said chart being marked with successive graduations corresponding to successive degrees of reflectivity of said material under increasing degrees of humidity absorbed thereby.

5. Apparatus for measuring humidity comprising a plate, a thin coating of granulated hygroscopic material of constant chemical composition on said plate, a pigment applied to said material, and a chart applied to said plate for comparison with said material, said chart comprising successive graduations marked upon said plate corresponding to successive degrees of reflectivity of said material under increasing degrees of humidity absorbed thereby.

References Cited in the file of this patent

UNITED STATES PATENTS

| Number | Name | Date |
| --- | --- | --- |
| 650,149 | Howard | May 22, 1900 |
| 1,933,803 | Hickman | Nov. 7, 1933 |
| 2,094,158 | Luckiesh | Sept. 28, 1937 |
| 2,214,354 | Snelling | Sept. 10, 1940 |
| 2,240,082 | Thornthwaite | Apr. 29, 1941 |
| 2,254,609 | Kinzer | Sept. 2, 1941 |
| 2,504,299 | Cartwright | Apr. 18, 1950 |

FOREIGN PATENTS

| Number | Country | Date |
| --- | --- | --- |
| 226,366 | Great Britain | Dec. 24, 1924 |
| 393,094 | Great Britain | June 1, 1933 |
| 610,976 | Great Britain | Oct. 22, 1948 |